US008275177B2

(12) United States Patent
Fiebrink et al.

(10) Patent No.: US 8,275,177 B2
(45) Date of Patent: Sep. 25, 2012

(54) SYSTEM AND METHOD FOR MEDIA FINGERPRINT INDEXING

(75) Inventors: Rebecca A. Fiebrink, Plainsboro, NJ (US); Paul B. Lamere, Nashua, NH (US)

(73) Assignee: Oracle America, Inc., Redwood City, CA (US)

( * ) Notice: Subject to any disclaimer, the term of this patent is extended or adjusted under 35 U.S.C. 154(b) by 1158 days.

(21) Appl. No.: 12/126,769

(22) Filed: May 23, 2008

(65) Prior Publication Data
US 2009/0290764 A1    Nov. 26, 2009

(51) Int. Cl.
G06K 9/00 (2006.01)
G06K 9/34 (2006.01)

(52) U.S. Cl. ...................................... 382/124
(58) Field of Classification Search .................. 382/115, 382/116, 124, 125, 128, 137, 199, 272, 284; 713/186
See application file for complete search history.

(56) References Cited

U.S. PATENT DOCUMENTS

| 4,225,850 | A * | 9/1980 | Chang et al. ................ 382/124 |
| 6,963,975 | B1 | 11/2005 | Weare |
| 6,990,453 | B2 | 1/2006 | Wang et al. |
| 7,013,301 | B2 | 3/2006 | Holm et al. |
| 7,116,806 | B2 * | 10/2006 | Werthiem et al. ............ 382/124 |
| 7,356,168 | B2 * | 4/2008 | Tavares ..................... 382/115 |
| 7,359,532 | B2 * | 4/2008 | Acharya et al. ............ 382/124 |
| 7,430,310 | B2 * | 9/2008 | Kotovich et al. ............ 382/137 |
| 7,545,961 | B2 * | 6/2009 | Ahern et al. ................ 382/115 |
| 7,616,787 | B2 * | 11/2009 | Boshra ...................... 382/124 |
| 7,864,987 | B2 * | 1/2011 | Venkatanna et al. ......... 382/115 |
| 2006/0190450 | A1 | 8/2006 | Holm et al. |
| 2009/0290764 | A1 * | 11/2009 | Fiebrink et al. ............ 382/124 |

OTHER PUBLICATIONS

MusicIP, "Open Fingerprint™ Architecture," White paper, Version 1.0, Mar. 12, 2006, 10 pages.
Jaap Haitsma and Ton Kalker, "A Highly Robust Audio Fingerprinting System," 2003, pp. 211-221, vol. 32, No. 2, 9 pages.

* cited by examiner

*Primary Examiner* — Amir Alavi
(74) *Attorney, Agent, or Firm* — Robert C. Kowert; Meyertons, Hood, Kivlin, Kowert & Goetzel, P.C.

(57) ABSTRACT

A fingerprint and indexing service is implemented to receive a media object and generate a fingerprint corresponding to the media object. The fingerprint and indexing service may segment the fingerprint into frames and generate a confidence value for each bit within each frame. The confidence values may be added together and totaled, such that each frame has a corresponding confidence score. The frames may be ranked, according to their confidence scores. N of the top ranked frames may be selected as the index. Subsequently, a search component may determine the index values for a query media object. The database of media objects may be searched for matching index values for fingerprints with fingerprint lengths matching the query media object's length. Once a match is declared, the fingerprints of the query media object and the matching media objects within the database may be compared to determine if a match exists.

20 Claims, 6 Drawing Sheets

SYSTEM AND METHOD FOR MEDIA FINGERPRINT INDEXING

BACKGROUND

Two media objects (e.g., music files) that perceptually sound the same to the human listener may not have identical digital content. For example, two audio files of the same song may be in two different digital formats (e.g., MP3™ and WMA™). In another example, two copies of the same song (e.g., both ripped from the same CD-ROM disk) may be digitally different due to bit errors incurred when the two songs were independently ripped from the disk.

Fingerprinting refers to generating a digital identifier, or "fingerprint" from a media object, such that identical or closely matching fingerprints are generated from two or more digital media objects that contain perceptually equivalent (e.g., to the human listener) content. Typically, the fingerprint is much smaller than the original media object.

A common task in fingerprinting systems is to search through a database or catalog of fingerprints to find matches for a query fingerprint. One approach to the search is to compare all of the fingerprints in the database to the query fingerprint. If the database is large, this is not efficient. Another approach is to use an indexing scheme to reduce the number of comparisons.

Generally speaking, fingerprinting and indexing media objects to enable fast, accurate searches may be very complex.

SUMMARY

Various embodiments of methods and systems for a media fingerprinting and indexing service are disclosed. A media fingerprint may be defined as a concise digital representation of a media object, computed from its perceptual (e.g., to the human listener) attributes. An example of a media object is a digital audio object. Other examples include digital video and digital multi-media objects.

A media fingerprint and indexing service may generate a fingerprint for a media file. The fingerprint may include one or more frames, each frame corresponding to a different time segment of the media file. Each value of each frame may have an associated confidence value indicating the accuracy of that value. For each frame of the fingerprint, the fingerprint and indexing service may combine the confidence values for that frame to produce a confidence score for the frame of the fingerprint. The fingerprint and indexing service may select a portion of the frames with the highest confidence scores and generate an index based on the position of each selected frame in the fingerprint.

The fingerprint and indexing service may further be configured to search for fingerprints matching a query fingerprint. The fingerprinting and indexing service may generate a fingerprint and index for a query media object and search a database for indices that match the query media file index. The search may take into consideration the length of the media object or the number of frames included in the media object. In response to finding one or more matching frames, the fingerprint associated with the matching frame(s) may be compared to the fingerprint associated to the query media object.

Figure 1:
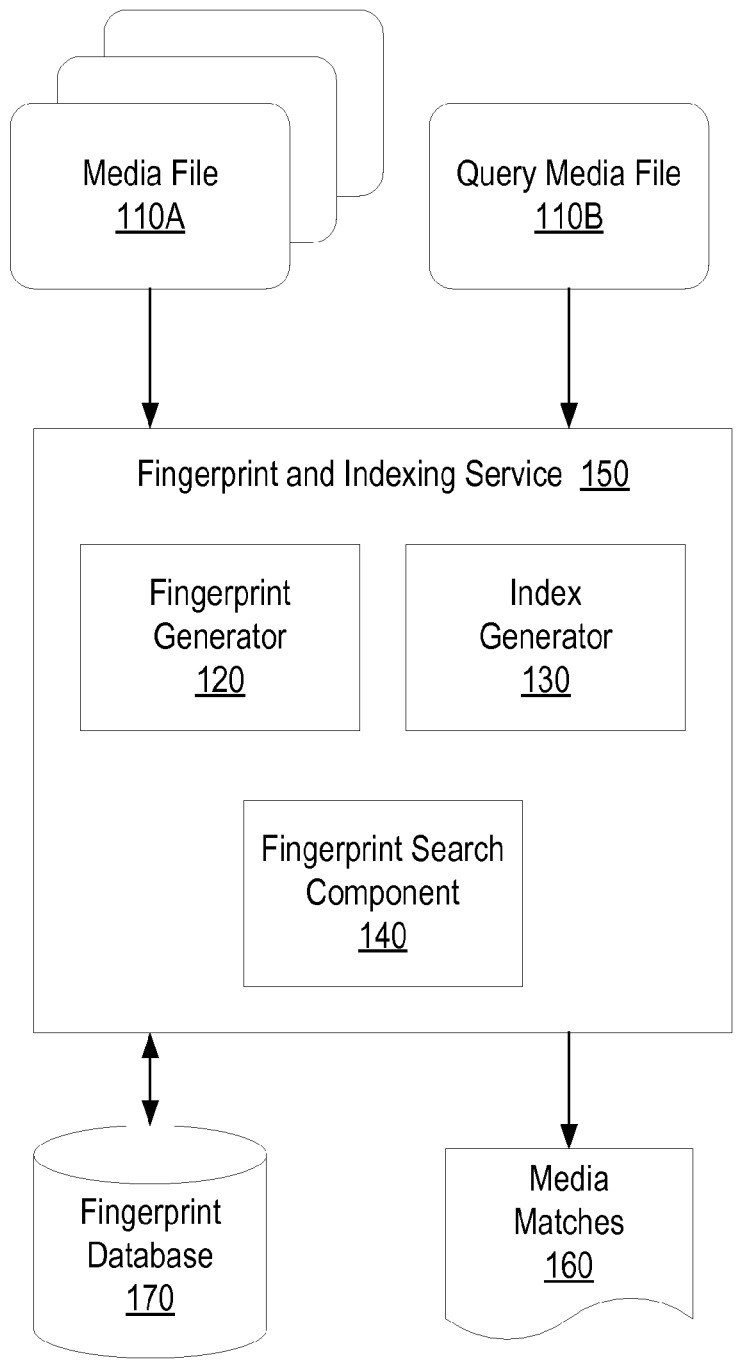
FIG. 1 is a block diagram illustrating media fingerprint indexing, according to an embodiment.

While the system is described herein by way of example for several embodiments and illustrative drawings, those skilled in the art will recognize that the system is not limited to the embodiments or drawings described. It should be understood, that the drawings and detailed description thereto are not intended to limit the system to the particular form disclosed but on the contrary, the intention is to cover all modifications, equivalents and alternatives falling within the spirit and scope of the present system as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words, "include", "including", and "includes" mean including, but not limiting to.

DETAILED DESCRIPTION OF EMBODIMENTS

The objective of media fingerprinting is to generate an identity for a media object. The fingerprint is a numeric identifier created from a piece of media. A fingerprint may be used with metadata (e.g., artist name, song title) to identify a media object (e.g., audio file). Media objects are typically very large and fingerprints are typically small in comparison. Metadata and fingerprints for a large number of media objects are typically stored in a catalog or database. When a new media object does not have associated metadata identifying the media object, a query fingerprint may be generated and compared against other fingerprints in the database to determine if a copy exists, or perhaps to determine the name of the media (e.g., song title) by finding the associated metadata. Creating indices for the fingerprints in the database greatly speeds up the search process by reducing the number of required comparisons. With an appropriate indexing scheme, comparisons will only be made between the query fingerprint and fingerprints in the database that have a high probability of matching. For example, one or more index values (e.g., integers) may be assigned to each fingerprint in the database. Index values may also be assigned to a query fingerprint. When searching the database for a fingerprint that matches the query fingerprint, only those fingerprints in the database that have one or more indices in common with the query fingerprint may be considered.

Indices generated from any two media fingerprints computed from the same media may be similar or identical, regardless of whether the two files from which the fingerprints were computed have the same compression scheme, signal to noise ratio, bit-rate, or other features that are not essential to media identification by a human listener. The approach describe herein, is to select portions of the fingerprint for use in creating index values by selecting frames from a two dimensional matrix. One dimension may represent frequency and the other dimension may represent time. Each frame may correspond to a group of selected frequency values measured at a point in time. The locations of selected frames may be used in a scaled format (e.g., according to their positions within the song, such as where the frames are located according to the length of the song), along with other information computed from the fingerprint, (e.g., the length of the song) to generate index values for the fingerprint.

Each frame of binary data may be used to generate an index for a fingerprint. A confidence value may be calculated for each bit within the frame. Subsequently, a confidence score may be calculated for each frame as a sum of the confidence values for all bits within the frame. The frames may be ranked by their confidence scores (e.g., highest to lowest) and the most confident frames may be selected as the index. Indices generated using these selected frames are highly consistent across fingerprints generated from different versions of the same piece of media. The indices may be generated from the fingerprint itself, no additional analysis of the media signal may be required beyond that of the fingerprint computation.

Although the methods and systems described herein are focused on audio objects, various modifications to the disclosed embodiments will be readily apparent to those skilled in the art, such that the general principles described may be applied to other embodiments, such as multimedia objects, video objects and image objects.

FIG. 1 is a block diagram illustrating media fingerprint indexing, according to an embodiment. In various embodiments, media object 110 may be implemented as a digital audio signal, digital audio stream, digital audio file or as an analog audio signal, video file or multi-media file. In some embodiments, media object 110 may be implemented in various digital formats such as MP3™, MP4 ™, Windows Media Audio WMA™, AIFF™, Au™, WAV™, Real Audio™, or another suitable format. Media object 110 may be compressed or uncompressed.

Fingerprint and indexing service 150 may receive media object 110. In some embodiments, media object 110 may be implemented as an audio file and fingerprint and indexing service 150 may open and read the audio file from a storage device. In another case, media object 110 may be received, streamed or read over a network connection (e.g., the Internet). In the case where media object 110 is implemented as an analog audio signal, fingerprint and indexing service 150 may be configured receive the analog audio signal and convert it into a digital format prior to fingerprinting and indexing the signal.

Fingerprint and indexing service 150 may be configured to fingerprint and index media object 110. Fingerprint and indexing service 150 may comprise fingerprint generator 120, index generator 130 and fingerprint search component 140. Fingerprint and indexing service 150 may be implemented on any computing device configured to read or receive a media object 110. Fingerprint and indexing service 150 may be implemented on various computing platforms such as a desktop computer, server, laptop, cell phone or PDA. Fingerprint and indexing service 150 may be implemented as one or more application programs, services, daemons and/or device drivers. Fingerprint and indexing service 150 may execute on various operating systems such as Microsoft Windows XP™, Microsoft Vista™, Linux, Unix™, MAC OS™, Solaris™, or another suitable operating system.

In various cases, fingerprint and indexing service 150 and it's components (e.g., fingerprint generator 120, index generator 130 and fingerprint search component 140) may be written in a procedural language, such as C or C++ and compiled into an executable code module, or implemented in a language that may be interpreted at application runtime, such as Java or C#. Fingerprint and indexing service 150 may utilize a framework, such as J2EE™ or .NET™. Fingerprint and indexing service 150 and its components may be implemented in, or use technologies such as Hypertext Markup Language (HTML), Javascript, Perl, Common Gateway Interface (CGI), eXtensible Markup Language (XML), Simple Object Access Protocol (SOAP), web service technologies such as .NET™, etc., or another suitable technology for providing application functionality.

In some embodiments, fingerprint generator 120, index generator 130 and fingerprint search component 140 may be included in the same application. In other embodiments they may be implemented as two or more separate applications. The applications may be implemented on the same computing device or on separate computing devices, communicating with one another via network connection. In some embodiments, fingerprint generator 120, fingerprint search component 140 and index generator 130 may be implemented as components of another application, such as a music editing or recording application.

Fingerprint generator 120 may be configured to create a fingerprint of media object 110. A media fingerprint may be a unique code generated from a media object (e.g., audio file). The media fingerprint may be used to identify a media sample (e.g., one or more time slices of an entire length of an audio recording). A media fingerprint is different than a hash code. A media fingerprint may be generated according to the perceptual characteristics of the media object. For example, two audio files may sound perceptually identical to the human listener, even though their digital representation may differ. The same song may be recorded in two different formats (e.g., MP3™ and WMA™), making their binary data different, even though they may sound the same to the human listener. An audio fingerprint of an MP3™ recording and an audio fingerprint of a WMA™ recording of the same song may be very similar, since the fingerprints are determined from song's perceptual attributes and not from the binary representation.

Media fingerprinting may begin by segmenting the media signal into frames. A spectral analysis may be performed on the waveform of selected frames (e.g., time segments) of the media signal. For every frame, a set of attributes may be determined. Example attributes include Fourier Coefficients, Mel Frequency Cepstral Coefficients, spectral flatness, sharpness, and others. The output of the spectral analysis may be a two-dimensional matrix with frequency on one axis and time on the other.

The matrix of media attributes may be very large, and a smaller representation (e.g., fingerprint) used for identification purposes may be desirable. The matrix of media attributes may be transformed into a more compact representation using a classification algorithm. For example, each frame may be mapped to a 32-bit integer value; each bit representing a different frequency band within the frame. For example, 15 frequency bands may be selected within the range of 300 Hz to 2000 Hz, the most relevant range for the human auditory system.

During the transformation process, a confidence value may be generated for each bit within the compact representation of the fingerprint. The confidence value may be determined by comparing each bit to a threshold. If the bit is very much passed the threshold of being a 1 versus a 0, then there is a high confidence of it being a 1. On the other hand, if the bit is very much passed the threshold of being a 0 versus a 1, then there is a high confidence of it being a zero. This technique may be performed under the assumption that there is a high correlation between the highly confident bits and the actual bits of the media object. For example, when comparing two versions of the same song, if the two versions have bits that are in common and the bits are ranked with a high confidence score, then those bits are likely to have the same value and therefore a match may be found.

Index generator 130 may be configured to index the fingerprints of media objects 110. Indices may be utilized to speed up the process of searching through a database of fingerprints for a particular fingerprint. As described above, fingerprint generator 120 may generate a confidence value for each bit within a frame. Index generator 130 may add the confidence values for each frame, resulting in a total confidence score for each frame. This invention is not limited to adding the confidence scores. In other embodiments, other calculations may be performed other than adding the confidence scores. The frame confidence scores may be ranked from highest (i.e., most confident) to lowest (i.e., least confident). For example, a fingerprint may comprise 100 frames and the most confident frames may be at positions 2, 5, 68, 50 and 88 and ranked from highest to lowest. Once the frames are ranked, information about N of the highest ranked frames may be mapped into storage bins, where N is a value less than the total number of frames. This process scales down the total number of frames into a small number of bins. Frame information may be mapped according to the frame's position within the media object. For example, if there are 100 frames and N=20, information about the top 20 ranked frames may be mapped into 20 storage bins. Mapping may take place according to the frame position within the media object. For example, if the frame with the highest frame confidence score is frame 50 (e.g., out of 100 frames), information about frame 50 may be mapped into storage bin 10 (e.g., half way point in the 20 total storage bins). Information about the frame may include the frame position within the media fingerprint, a unique identifier for the fingerprint, and the length of the media object (e.g., the length of the song in seconds). Other information or less information may be stored.

Fingerprint search component 140 may be configured to search fingerprint database 170 for fingerprints that match a query fingerprint. Following is an example of how fingerprint search component 140 may work. When it is time to search fingerprint database 170 for a match to a query media object 110B, a fingerprint and index may be generated for the query fingerprint using the indexing algorithm described above. Only the fingerprints in the database that have one or more indices in common with query media object 110B may be compared. Further, only the fingerprints that have the same (or nearly the same) media length or the same number of frames may be compared. When an index match is found, the entire fingerprint is retrieved from the fingerprint database 170 and compared to the fingerprint of query media object 110B in order to determine fingerprint matches. (See the description for FIG. 5 below for more information.)

Fingerprint database 170 may store the media file and the associated fingerprint data, metadata, and index data. Fingerprint and indexing service 150, fingerprint generator 120, search component 140 and index generator 130 may read and write data to fingerprint database 170. In some embodiments, fingerprint database 170 may be implemented as one or more files within a file system. In other embodiments, fingerprint database 170 may be implemented as a relational database or another type of database; metadata, fingerprint and index data may be stored in one or more tables or other data structures within the database. Fingerprint database 170 may be stored on one or more storage devices, such as one or more disk drives. In some embodiments, fingerprint database 170 may be stored on a non-volatile memory device, such as FLASH memory. Fingerprint database 170 may be located on the same system as fingerprint and indexing service 150 or may be located on a separate system, such as on a separate server. In this case fingerprint service 150 may access fingerprint database 170 via network connection.

In various embodiments, a network may be configured to allow data (e.g., media object 110) to be shared between fingerprint and indexing service 150, fingerprint generator 120, index generator 130, fingerprint search component 140 and fingerprint database 170. The network may correspond to various methods of communication between entities and may include, but is not limited to communication via telephone, fax, email, messages (e.g., instant messaging), voice messages, and electronic documents (e.g., web page, email or file transfers). In general, the network may represent any method that one entity may utilize to communicate with another entity. While the network may be illustrated in a generalized manner, one of ordinary skill in the art will recognize that the network is meant to be representative of a complete communication path between the entities depicted in FIG. 1 with a specific type of communication channel. For example, the network may represent one or more communications channels and may include one or more telecommunications networks as well as various data networks. The network may include network devices such as circuits, switches, routers, hubs and/or gateways. The network may support communication via wired or wireless general data networks, such as any suitable type of network including the Internet and/or Ethernet LAN; via telecommunications/telephony networks such as analog voice networks or digital fiber communications networks; via storage area networks such as Fiber Channel SANs, or via any other suitable type of network and/or protocol. Data may be transmitted on the network using Hyper Text Transport Protocol (HTTP), Secure Hyper Text Transport Protocol (HTTPS), Secure Socket Layer Protocol (SSL), Transport Layer Security Protocol (TLS) or another suitable network transport protocol. In various embodiments, the methods and systems described herein may utilize any suitable data compression or cryptographic protocol when communicating over the network.

Figure 2:
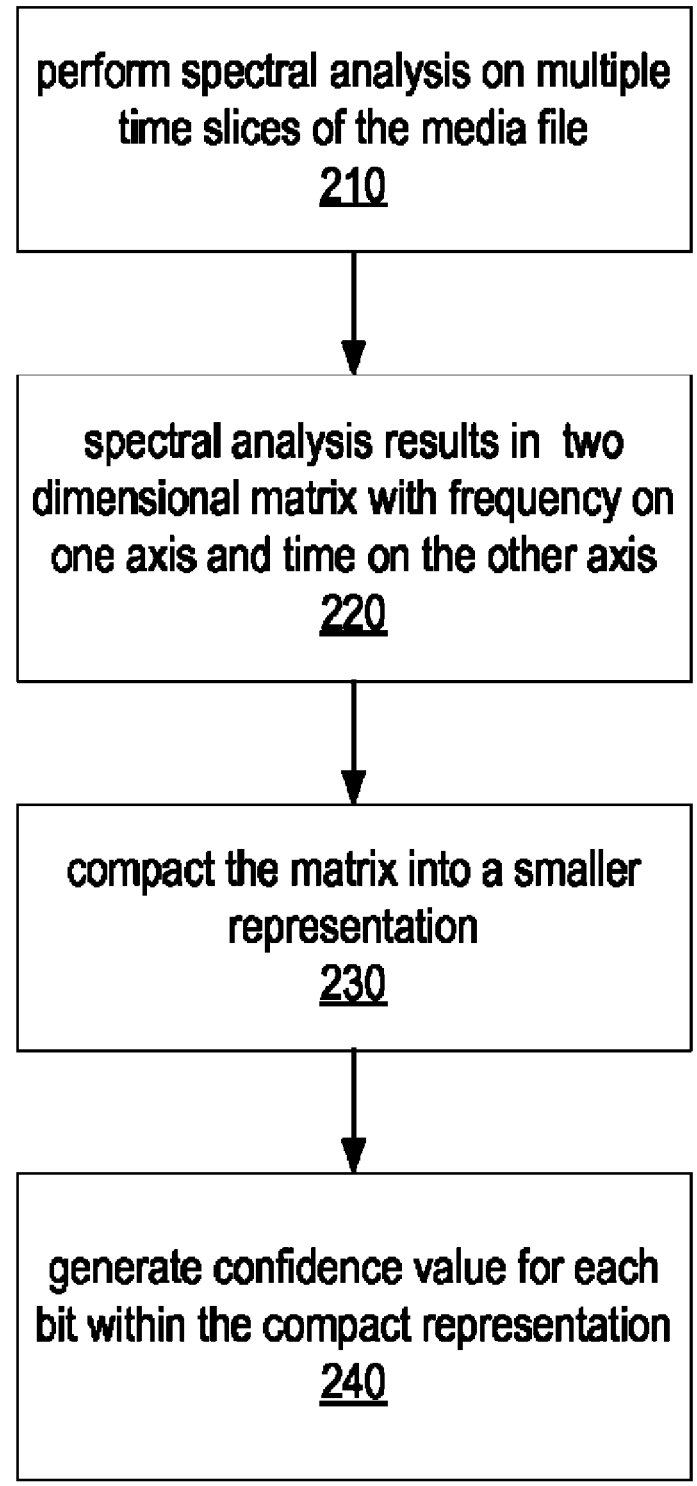
FIG. 2 is a flow diagram illustrating media fingerprinting, according to an embodiment.

FIG. 2 is a flow diagram illustrating media object fingerprinting, according to an embodiment. Fingerprint generator 120 may receive media object 110 (consisting of a large number of bits) and may return a fingerprint (consisting of a small number of bits). A spectral analysis may be performed for selected time segments of the media, as shown in block 210. A spectral analysis for one time segment does not provide enough information to identify a media object 110. Therefore multiple time segments must be analyzed. The spectral representation may be computed by performing a Fourier transform on every frame as shown in block 220. (Other algorithms may be performed.) The result is a two dimensional matrix with frequency on one axis and time on the other axis.

As shown in block 230, the matrix may be compacted into a smaller representation. In some embodiments, the smaller representation may result in a 32-bit number for each frame within the matrix. During the compaction process, confidence scores may be generated (block 240) for each bit within the compact representation. The confidence scores may be determined by threshholding bits, and comparing each bit value to neighboring values (e.g., neighboring bits, and bits in neighboring frames).

Figure 3:
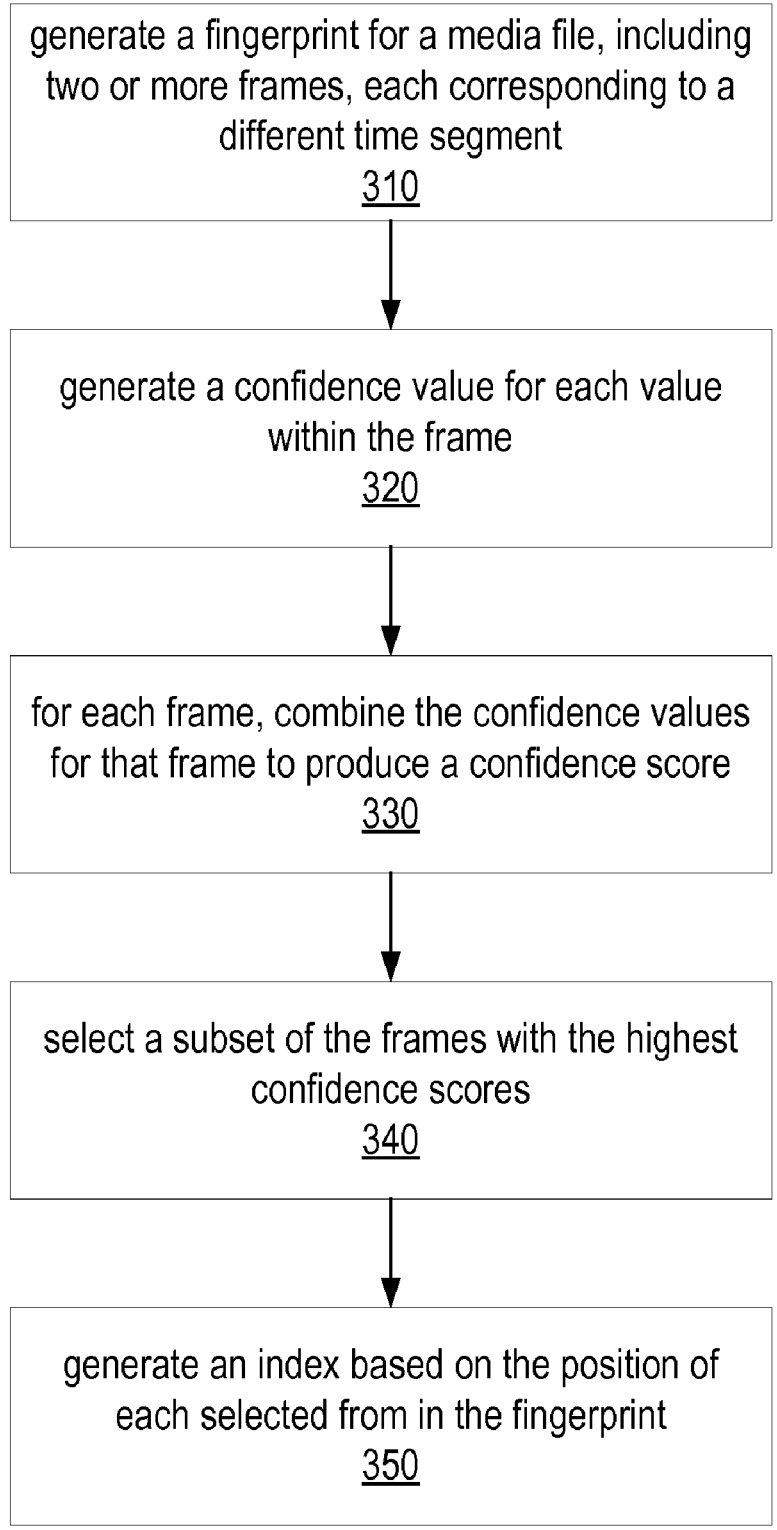
FIG. 3 is a flow diagram illustrating media fingerprint indexing, according to an embodiment.

FIG. 3 is a flow diagram illustrating fingerprint indexing, according to an embodiment. As shown in block 310, a fingerprint may be generated for a media file. The fingerprint may include two or more frames, each corresponding to a different time segment, as shown in block 310. A confidence value may be generated for each bit within the frame (block 320) and the confidence values may be combined for each frame (block 330). The result is a confidence score representing each frame.

After calculating a confidence scores for each frame, the frame confidence scores may be ranked, or ordered from highest to lowest as shown in block 340. At this point, index generator 130 may choose the N most confident frames, as shown in block 350. For example, if there are 256 frames for media object 110, index generator 130 may select the 20 frames with the highest confidence scores from the ordered list. The number of frames selected (e.g., the value of N) may be variable. By selecting a large number for N, more comparisons may be performed, resulting in lower performance, but a higher probability of finding matches. By selecting a smaller number for N, performance is better, but it comes with a lower probability of finding matches. In some embodiments N may represent a percentage of the frames according to the ranking.

The index for the fingerprint is the value for each selected frame, such that each value of the index indicates a position of the corresponding frame relative to the length of the fingerprint.

Figure 4:
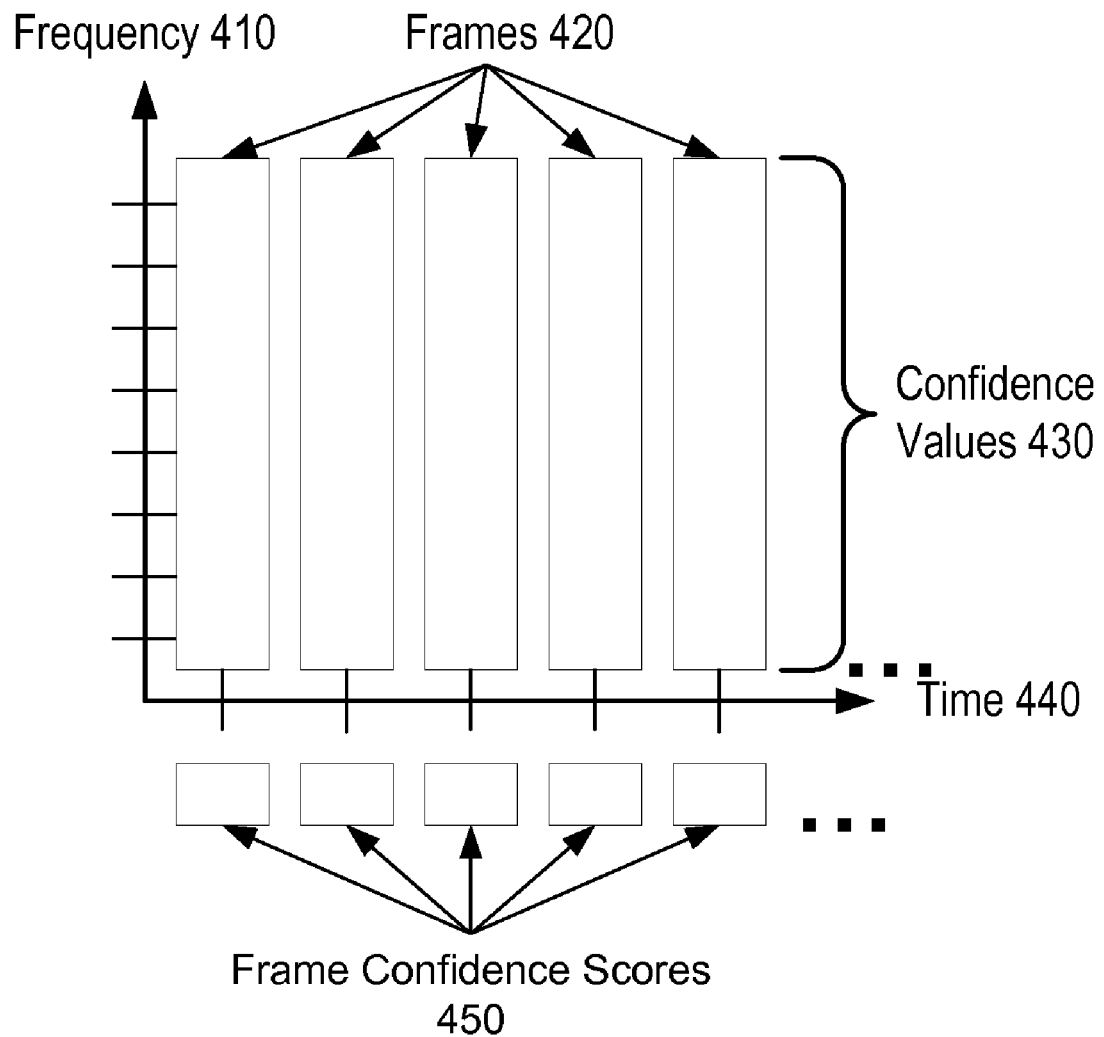
FIG. 4 is a block diagram illustrating a matrix of frame confidence scores, according to an embodiment.

FIG. 4 is a block diagram illustrating a matrix of frame confidence scores, according to an embodiment. As shown it item 410, the Y-axis of the matrix may represent frequency and the X-axis (shown at item 440) may represent time. Confidence scores 430 may be calculated for each bit within the fingerprint matrix. The confidence scores for each frame may be added together and the result for each frame may be frame confidence score 450. Note that although only five frames are shown in the diagram. There may be many more frames for a specified media object 110.

Once a confidence score is calculated for each frame (e.g., item 450), the frame confidence scores 450 may be ranked from highest to lowest and N confidence scores may be selected as the index. In various embodiments, index information may further include the number of frames within the fingerprint, or the length of the fingerprint, or the length of the media file, or the length in time (e.g., length of the media object). In some embodiments the length of the fingerprint may be determined by starting from the foremost one of the selected frames for the fingerprint. The foremost one of the selected frames may be the frame closest to the beginning of the media fingerprint with a high confidence score.

Figure 5:
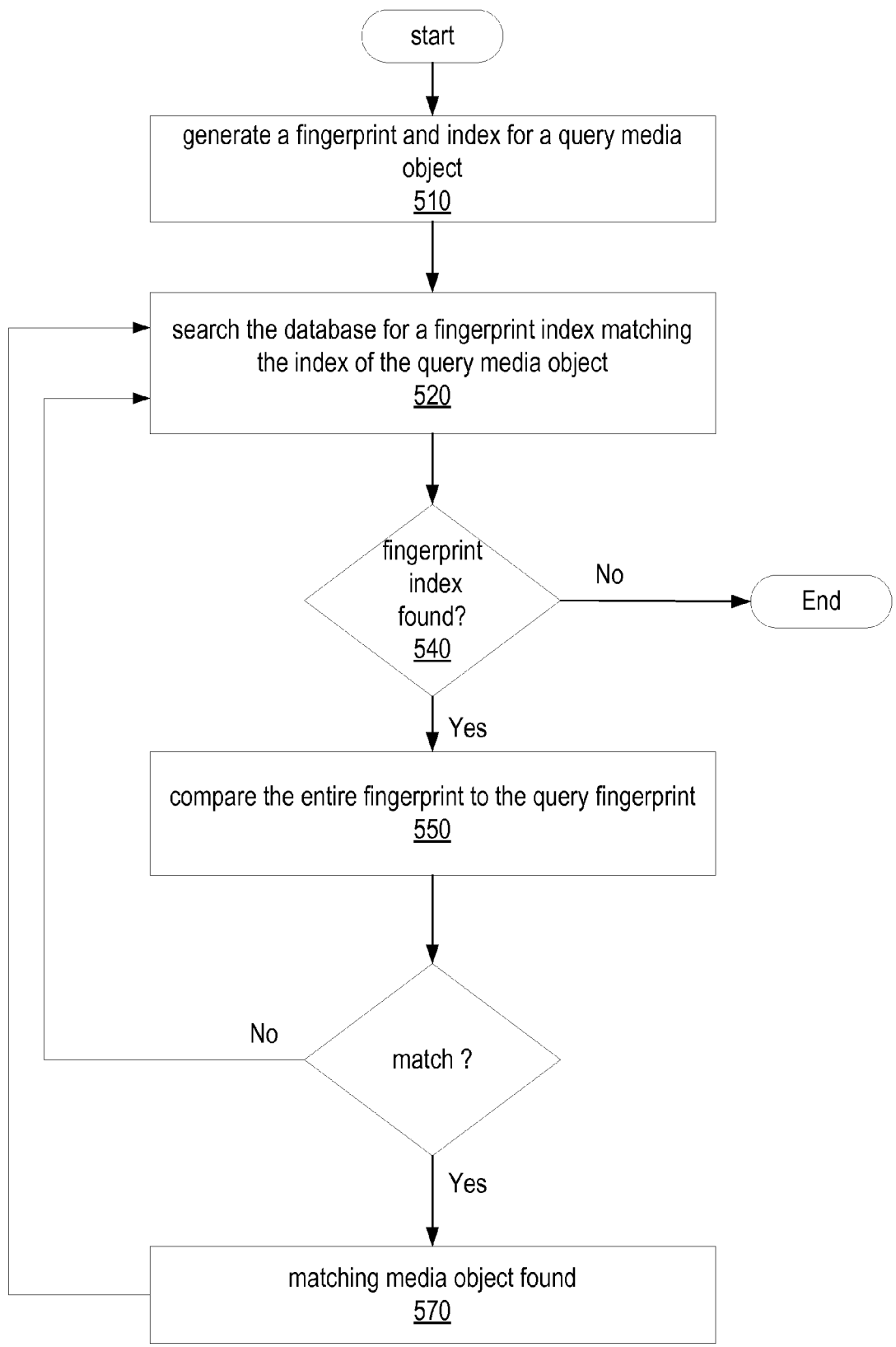
FIG. 5 is a flow diagram illustrating searching for a matching media object utilizing a fingerprint index, according to an embodiment.

FIG. 5 is a flow diagram illustrating a search for a matching media fingerprint utilizing a fingerprint index, according to an embodiment. As shown in block 510, fingerprint generator 120 and index generator 130 may generate a fingerprint and an index for query media object 110B. Fingerprint search component 140 may receive the fingerprint and index information for query media object 110B and perform a search for matching fingerprints in fingerprint database 170.

As shown in block 520, fingerprint search component 140 may search for fingerprint indices with the most confident frames found in the query fingerprint for query media object 110B. In some embodiments, a match may be declared if all of the values (e.g., confident frames) are found to match. (See block 540.) In other embodiments, a match may be declared if one or more, but not all index values are found to match. In addition to matching index values, in some embodiments, the length of the fingerprint or the length of the media object may also be considered in determining a match. In some cases, two media objects (e.g., the same song) may not have exactly the same media length (e.g., in seconds). Therefore, the search may take into consideration minor differences (e.g., plus or minus one or two seconds or plus or minus one or two frames) in media lengths.

If a match is found (block 540) the fingerprint may be retrieved from the fingerprint database 170. The fingerprints (e.g., the fingerprint for query media file 110B and the fingerprint of the media object found in the search) may then be compared to determine if they are similar. Note that the fingerprints do not have to be mathematically identical, only similar. In some embodiments, there may be a function F and a threshold T. The media objects to be compared may be X and Y. If the fingerprints are similar, $F(X)-F(Y)<T$ then a match may be found, as shown in block 570. If the fingerprints and dissimilar, $F(X)-F(Y)>T$. Other techniques may be used to compare media fingerprints.

Figure 6:
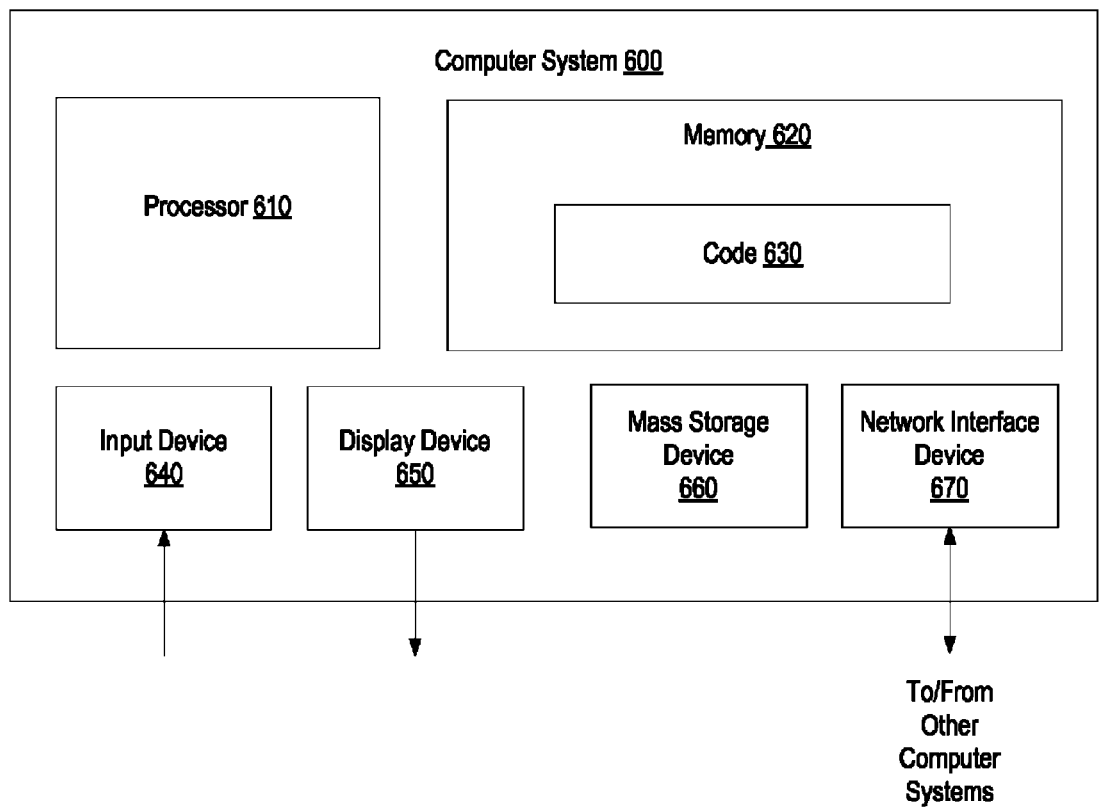
FIG. 6 is a block diagram illustrating a system for media fingerprint indexing, according to an embodiment.

FIG. 6 is a block diagram illustrating a computing device, according to an embodiment. Various components of embodiments of the client systems, databases, storage devices, clients and nodes, etc., as described herein, may be executed on one or more computer systems, which may interact with various other devices. One such computer system is illustrated by FIG. 6. In the illustrated embodiment, computer system 600 includes one or more processors 610 coupled to a system memory 620. Computer system 600 further includes a network interface 670 and one or more input/output devices 640/650, such as a cursor control device, keyboard, audio device and display device 650. In some embodiments, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments, processors 610 may be general-purpose or embedded processors implementing any of a variety of instruction set architectures (ISAs), such as the x86, PowerPC™, Scalable Processor Architecture (SPARC™), or Million Instructions per Second (MIPS™) Instruction Set Architectures (ISAs), or any other suitable ISA. In multiprocessor systems, each of processors 610 may commonly, but not necessarily, implement the same ISA.

System memory 620 is one example of a computer accessible medium that may be configured to store program instructions 630 and/or data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. Program instructions and/or data may also be stored, for example, on a hard disk. In the illustrated embodiment, program instructions and data implementing desired functions, such as those described above for media fingerprint and indexing service 150, as well as any of the methods shown in FIGS. 1-5, are shown stored within system memory 620 as program instructions 630 and data storage 660, respectively. In other embodiments, program instructions and/or data may be stored upon different types of computer-accessible media or on similar media separate from system memory 620 or computer system 600. Generally speaking, a computer-accessible medium may include storage media or memory media such as magnetic or optical media, e.g., disk or DVD/CD-ROM, volatile or non-volatile media such as RAM (e.g. Synchronous Dynamic RAM (SDRAM), Double Data Rate RAM (DDR RAM), RAMBUS Dynamic RAM (RDRAM), Static RAM (SRAM), etc.), Read Only Memory (ROM). Program instructions and data stored via a computer-accessible medium may be transmitted by transmission media or signals such as electrical, electromagnetic, or digital signals, which may be provided via a communication medium such as a network and/or a wireless link, such as may be implemented via network interface 670.

Network interface 670 may be configured to allow data to be exchanged between computer system 600 and other devices attached to a network, such as other computer systems, or between nodes of computer system 600. In various embodiments, network interface 670 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Input/output devices 640 and 650 respectively, may in some embodiments include one or more display terminals, keyboards, keypads, touchpads, scanning devices, voice or optical recognition devices, or any other devices suitable for entering or retrieving data by one or more computer system 600. Multiple input/output devices 640 and 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 670.

Memory 620 may include program instructions 630, configured to implement at least a portion of embodiments of the media fingerprint and indexing service 150, fingerprint generator 120, index generator 130 and fingerprint search component 140 as described herein; and data storage 660, comprising various documents, tables, databases, etc. accessible by program instructions 630. In one embodiment, program instructions 630 may include software elements of the fingerprint and indexing service 150 illustrated in the figures, and data storage 660 may include data used in embodiments of the fingerprint and indexing service 150. In other embodiments, different software elements and data may be included. Program instructions and/or data may be stored, for example, on various types of memory including hard disks.

Those skilled in the art will appreciate that computer system 600 is merely illustrative and is not intended to limit the scope of the system as described herein. In particular, the computer system and devices may include any combination of hardware or software that can perform the indicated functions, including computers, network devices, internet appliances, PDAs, mobile phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, provided via a communication medium such as a network and/or a wireless link. Various embodiments may further include receiving, sending or storing instructions and/or data implemented in accordance with the foregoing description. Accordingly, the present system may be practiced with other computer system configurations.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc. Additionally, it is intended that any inconsistency in description between this document and any document incorporated within this document be resolved in favor of this document.

Various modifications and changes may be made as would be obvious to a person skilled in the art having the benefit of this disclosure. It is intended that the system embrace all such modifications and changes and, accordingly, the above description to be regarded in an illustrative rather than a restrictive sense.

What is claimed is:

1. A computer-implemented method, comprising:
   generating a fingerprint for a media file, wherein the fingerprint comprises a plurality of frames, each frame corresponding to a different time segment of the media file, wherein each value of each frame has a confidence value indicating the accuracy of that value;
   for each frame of the fingerprint, combining the confidence values for that frame to produce a confidence score for each frame of the fingerprint;
   selecting a portion of the plurality of frames of the fingerprint having confidence scores greater than a remaining portion of the plurality of frames of the fingerprint;
   generating an index based on the position of each selected frame in the fingerprint.

2. The computer-implemented method as recited in claim 1, further comprising:
   generating a spectral matrix representation of the media file;
   wherein said fingerprint is generated from the spectral matrix representation.

3. The computer-implemented method as recited in claim 2, wherein each value in each frame of said fingerprint is a binary value representing a corresponding value of the spectral matrix representation.

4. The computer-implemented method as recited in claim 1, wherein, for each frame, said combining the confidence values comprises summing the confidence values for each value of that frame of the fingerprint to produce the confidence score for that frame.

5. The computer-implemented method as recited in claim 1, wherein said selecting comprises ranking the frames by confidence score for each frame and selecting a top number or percentage of the frames according to the ranking.

6. The computer-implemented method as recited in claim 1, wherein the index comprises a value for each selected frame, wherein each value of the index indicates a position of the corresponding frame relative to a length of the fingerprint.

7. The computer-implemented method as recited in claim 6, wherein said length of the fingerprint is determined starting from the foremost one of the selected frames in order of the frames of the fingerprint.

8. The computer-implemented method as recited in claim 1, wherein the index is further based on a length of the media file or total number of frames in the fingerprint.

9. The computer-implemented method of claim 1, further comprising, storing a fingerprint for each of a plurality of media files in a database, wherein each fingerprint within the plurality of fingerprints is associated to a corresponding index.

10. The computer-implemented method of claim 9, wherein said database further comprises metadata associated with each fingerprint, wherein said metadata comprises one or more of a song title and an artist name.

11. The computer-implemented method of claim 9, further comprising:
receiving a search query for said media file;
using said generated index to search the database for one or more matching fingerprints.

12. The computer-implemented method of claim 11, wherein said using comprises:
searching the indices of the database for indices having at least a partial match to the generated index;
for each index of the database having at least a partial match to the generated index, comparing the associated fingerprint from the database with the generated fingerprint.

13. A system, comprising:
one or more processors;
a memory coupled to one or more processors, wherein the memory stores program instructions executable by the one or more processors to implement a media fingerprint and indexing service, wherein said media fingerprint and indexing service is configured to:
generate a fingerprint for a media file, wherein the fingerprint comprises a plurality of frames, each frame corresponding to a different time segment of the media file, wherein each value of each frame has a confidence value indicating the accuracy of that value;
for each frame of the fingerprint, combine the confidence values for that frame to produce a confidence score for each frame of the fingerprint;
select a portion of the plurality of frames of the fingerprint having confidence scores greater than a remaining portion of the plurality of frames of the fingerprint;
generate an index based on the position of each selected frame in the fingerprint.

14. The system as recited in claim 13, wherein the media fingerprint and indexing service is further configured to:
generate a spectral matrix representation of the media file;
wherein said fingerprint is generated from the spectral matrix representation.

15. The system as recited in claim 14, wherein each value in each frame of said fingerprint is a binary value representing a corresponding value of the spectral matrix representation.

16. The system as recited in claim 13, wherein said selecting comprises ranking the frames by confidence score for each frame and selecting a top number or percentage of the frames according to the ranking 17. A non-transitory computer-accessible storage medium storing program instructions computer-executable to implement a media fingerprint and indexing service, configured to:
generate a fingerprint for a media file, wherein the fingerprint comprises a plurality of frames, each frame corresponding to a different time segment of the media file, wherein each value of each frame has a confidence value indicating the accuracy of that value;
for each frame of the fingerprint, combine the confidence values for that frame to produce a confidence score for each frame of the fingerprint;
select a portion of the plurality of frames of the fingerprint having confidence scores greater than a remaining portion of the plurality of frames of the fingerprint;
generate an index based on the position of each selected frame in the fingerprint.

18. The computer-accessible storage medium as recited in claim 17, wherein the media fingerprint and indexing service is further configured to:
generate a spectral matrix representation of the media file;
wherein said fingerprint is generated from the spectral matrix representation.

19. The computer-accessible storage medium as recited in claim 18, wherein each value in each frame of said fingerprint is a binary value representing a corresponding value of the spectral matrix representation.

20. The computer-accessible storage medium as recited in claim 17, wherein said selecting comprises ranking the frames by confidence score for each frame and selecting a top number or percentage of the frames according to the ranking.

* * * * *